US006936573B2

(12) United States Patent
Wertz et al.

(10) Patent No.: US 6,936,573 B2
(45) Date of Patent: Aug. 30, 2005

(54) SLOW RELEASE NITROGEN ROOT TREATMENT

(75) Inventors: Stacey L. Wertz, Conyers, GA (US); Kurt Gabrielson, Lilburn, GA (US); Robbie Kelly, Tyrone, GA (US); Paul Baxter, Conyers, GA (US); James Knight, Conyers, GA (US); James Wright, Lithonia, GA (US); Charles R. Davis, Conyers, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 10/396,706

(22) Filed: Mar. 26, 2003

(65) Prior Publication Data

US 2003/0220200 A1 Nov. 27, 2003

Related U.S. Application Data (60) Provisional application No. 60/367,278, filed on Mar. 26, 2002, and provisional application No. 60/379,402, filed on May 13, 2002.

(51) Int. Cl.$^7$ ............................. A01N 25/10; C05C 9/02

(52) U.S. Cl. ...................................... 504/367; 71/64.01

(58) Field of Search .......................... 504/367; 71/64.01

(56) References Cited

U.S. PATENT DOCUMENTS

| | | |
|---|---|---|
| 2,648,609 A | 8/1953 | Wurster |
| 2,986,840 A | 6/1961 | Rogers |
| 2,999,336 A | 9/1961 | Cescas |
| 3,316,676 A | 5/1967 | Legal, Jr. et al. |
| 3,438,764 A | 4/1969 | Church |
| 3,598,565 A | 8/1971 | Graves |
| 3,621,612 A | 11/1971 | Porter |
| 3,677,736 A | 7/1972 | Formaini |
| 3,707,807 A | 1/1973 | Graves |
| 3,713,800 A | 1/1973 | Karnemaat |
| 3,808,740 A | 5/1974 | Porter et al. |
| 3,905,152 A | 9/1975 | Loperfido |
| 3,911,183 A | 10/1975 | Hinkes |
| 3,981,845 A | 9/1976 | Renner |
| 4,025,329 A | 5/1977 | Goertz |
| 4,058,067 A | 11/1977 | Wright et al. |
| 4,066,490 A | 1/1978 | Yoshimi |
| 4,089,899 A | 5/1978 | Greidinger et al. |
| 4,120,685 A | 10/1978 | Vargiu et al. |
| 4,174,957 A | 11/1979 | Webb et al. |
| 4,190,981 A | 3/1980 | Muldner |
| 4,192,095 A | 3/1980 | Haslam et al. |
| 4,219,966 A | 9/1980 | McCalister |
| 4,245,432 A | 1/1981 | Dannelly |
| 4,249,343 A | 2/1981 | Dannelly |
| 4,251,952 A | 2/1981 | Porter et al. |
| 4,280,830 A | 7/1981 | Ferguson et al. |
| 4,298,512 A | 11/1981 | Sartoretto et al. |
| 4,333,265 A | 6/1982 | Arnold |
| 4,357,780 A | 11/1982 | Ball |
| 4,378,238 A | 3/1983 | Goertz |
| 4,409,015 A | 10/1983 | Grace, Jr. |
| 4,410,685 A | 10/1983 | Williams |
| 4,411,683 A | 10/1983 | Goertz |
| 4,429,075 A | 1/1984 | Carlson |
| 4,474,925 A | 10/1984 | Sartoretto et al. |
| 4,493,725 A | 1/1985 | Moon et al. |
| 4,501,851 A | 2/1985 | Williams |
| 4,526,606 A | 7/1985 | Formaini |
| 4,530,713 A | 7/1985 | Williams |
| 4,575,391 A | 3/1986 | DeBoodt et al. |
| 4,578,105 A | 3/1986 | Moore |
| 4,596,593 A | 6/1986 | Tazawa et al. |
| 4,735,015 A | 4/1988 | Schmolka |
| 4,735,017 A | 4/1988 | Gago et al. |
| 4,752,317 A | 6/1988 | Detroit |
| 4,753,035 A | 6/1988 | Ryan et al. |
| 4,756,738 A | 7/1988 | Detroit |
| 4,780,988 A | 11/1988 | Mielke et al. |
| 4,789,391 A | 12/1988 | Detroit |
| 4,832,728 A | 5/1989 | Allan et al. |
| 4,906,276 A | 3/1990 | Hughes |
| 4,960,856 A | 10/1990 | Formaini |
| 4,997,469 A | 3/1991 | Moore |
| 5,022,182 A | 6/1991 | Anderson |
| 5,039,328 A | 8/1991 | Saitoh et al. |
| 5,043,007 A | 8/1991 | Davis |
| 5,044,116 A | 9/1991 | Gago et al. |
| 5,106,648 A | 4/1992 | Williams |
| 5,110,898 A | 5/1992 | Formaini |
| 5,262,381 A | 11/1993 | Tusé et al. |
| 5,266,097 A | 11/1993 | Moore |
| 5,300,127 A | 4/1994 | Williams |
| 5,317,834 A | 6/1994 | Anderson |
| 5,344,471 A | 9/1994 | Tusé et al. |
| 5,443,637 A | 8/1995 | Long, Jr. et al. |

(Continued)

FOREIGN PATENT DOCUMENTS

| | | |
|---|---|---|
| DE | 43 08 505 A1 | 9/1994 |
| EP | 1 288 179 A1 | 5/2003 |
| GB | 2 229 350 A | 9/1990 |
| JP | 50 40321 | 4/1975 |
| JP | 3-22905 | 1/1991 |

OTHER PUBLICATIONS

Copy of specification "Slow Release Nitrogen Fertilizer" (22 pgs.) claiming benefit of U.S. Appl. No. 60/367,278, filed Mar. 26, 2002 and 60/379,402, filed May 13, 2002.

Porter, F.E., Chemtech, May 1978, pp. 284–287.

(Continued)

Primary Examiner—S. Mark Clardy
(74) Attorney, Agent, or Firm—Banner & Witcoff, Ltd.

(57) ABSTRACT

A method for treating a seedling by dipping the roots of the seedling into a composition containing a slow release, particulate urea-formaldehyde polymer, which is useful as a fertilizer for enhancing the extended delivery of nitrogen needed for plant development and growth and to the composition useful as the root dip, or as a soil drench.

17 Claims, 2 Drawing Sheets

U.S. PATENT DOCUMENTS

| | | |
|---|---|---|
| 5,494,709 A | 2/1996 | Long, Jr. et al. |
| 5,501,720 A | 3/1996 | Buchholz |
| 5,618,330 A | 4/1997 | Artozon Sylvester |
| 5,640,803 A | 6/1997 | Kloepper et al. |
| 5,674,971 A | 10/1997 | Graves |
| 5,797,976 A | 8/1998 | Yamashita |
| 5,849,320 A | 12/1998 | Turnblad et al. |
| 5,860,245 A | 1/1999 | Welch |
| 5,935,839 A | 8/1999 | Kloepper et al. |
| 5,935,909 A | 8/1999 | Sanders |
| 6,009,663 A | 1/2000 | Kazemzadeh |
| 6,022,827 A | 2/2000 | Kumar et al. |
| 6,048,378 A | 4/2000 | Moore |
| 6,058,649 A | 5/2000 | Bittman et al. |
| 6,088,957 A | 7/2000 | Kazemzadeh |
| 6,202,346 B1 | 3/2001 | Lyons et al. |
| 6,209,259 B1 | 4/2001 | Madigan et al. |
| 6,230,438 B1 | 5/2001 | Zaychuk et al. |
| 6,306,194 B1 | 10/2001 | Wertz et al. |
| 6,309,440 B1 | 10/2001 | Yamashita |
| 6,318,023 B1 | 11/2001 | Yamashita |
| 6,432,156 B1 | 8/2002 | O'Donnell, Sr. |
| 6,464,746 B2 | 10/2002 | Neyman et al. |
| 6,515,177 B1 | 2/2003 | O'Donnell, Sr. |
| 2002/0103086 A1 | 8/2002 | Asrar et al. |
| 2002/0134012 A1 | 9/2002 | Ding et al. |
| 2002/0139046 A1 | 10/2002 | Weber et al. |
| 2003/0228981 A1 | 12/2003 | Wertz et al. |
| 2004/0023809 A1 | 2/2004 | Wertz et al. |

OTHER PUBLICATIONS

Ros, C., et al., Seed Sci. & Technolo., 28: pp. 391–401, 2000.

J.E. Matocha, *"Effect of Seed Coating Protectants on Iron Deficiency Chlorosis and Sorghum Plant Growth"*, Journal of Plant Nutrition, 15(10), 2007–2013 (1992).

International Search Report dated Aug. 8, 2003.

International Search Report dated Oct. 2, 2003.

International Search Report dated Nov. 13, 2003.

SLOW RELEASE NITROGEN ROOT TREATMENT

This application claims the benefit of provisional application 60/367,278 filed Mar. 26, 2002 and Provisional application 60/379,402 filed May 13, 2002.

FIELD OF THE INVENTION

The present invention is directed to a process for enhancing the growth of plants by treating their root system. The present invention specifically relates to method for treating the root systems of seedlings using a new source of slow release nitrogen in order to enhance the delivery of nitrogen needed for plant development and growth. The invention also is directed to adding the particulate source of slow release nitrogen to soil as a way to enhance plant development and growth in the soil.

BACKGROUND OF THE INVENTION

Treating the roots of seedlings, especially tree seedlings such as conifer nursery seedlings, prior to transplanting is a known practice. Usually, the roots of the seedlings are simply dipped into a treatment solution prior to planting the seedling in the desired growth media. Root-soak and root-coat treating solutions have included pesticides, fungicides, microorganisms, and polymeric materials to prevent desiccation. The objective of the treatment is to enhance the survival rate and the re-growth rate of the treated seedlings.

In many cases, the phytotoxicity of a potential treatment material or compound precludes intimate contact between the root and the treatment material as would be encountered in the normal manner of dipping roots into solutions or suspensions of the treatment material. For this reason, typical nitrogen fertilizers, which generally have a sizeable content of readily available nitrogen, have not been routinely used in root treatment compositions. It has been suggested that by pre-coating the roots before treatment even phytotoxic materials can be used in such applications. The complexity introduced by such proposal, however, has prevented general acceptance of this approach.

Fertilizer is often applied as a formulated (N—P—K) solid, granular or powder, or sometimes as a liquid to an area to be fertilized. There are basically two types of fertilizers, water soluble fertilizers and "slow release" fertilizers. While water soluble fertilizers are generally less expensive than slow release fertilizers, they have the disadvantage of leaching nutrients very quickly into and through the soil. Some solid, water soluble fertilizers can be made slow release by various coatings. Alternatively, a reduction in nitrogen availability also can be obtained by using enzyme inhibitors. Slow release fertilizers are designed to release nutrients to plants or soil over an extended period of time, which is more efficient than multiple applications of water soluble fertilizers. Therefore, slow release fertilizers (also referred to as controlled release or extended release) minimize the frequency with which plants must be fertilized, as well as reduce or minimize leaching.

Urea-formaldehyde (UF) condensation products are widely used as slow release nitrogen fertilizers in crops, ornamental plants and grasses. Urea-formaldehyde fertilizer materials also can be supplied either as liquids or as solids and are the reaction products of urea and formaldehyde. Such materials generally contain at least 28% nitrogen, largely in an insoluble but slowly available form.

Extended release UF fertilizers (ureaform) can be prepared by reacting urea and formaldehyde at an elevated temperature in an alkaline solution to produce methylol ureas. The methylol ureas then are acidified to polymerize the methylol ureas to methylene ureas, which increase in chain length as the reaction is allowed to continue.

The methylene urea polymers that the condensation products normally contain have limited water solubility and thus release nitrogen throughout an extended period. The mixture of methylene urea polymers generally have a range of molecular weights and are understood to be degraded slowly by microbial action into water soluble nitrogen. Even so, the commercially available UF fertilizers, which are usually evaluated by the amount and the release characteristics of their water insoluble nitrogen, typically release their nitrogen too rapidly to be useful in seedling treatment applications.

The forestry industry which is responsible for supplying the vast numbers of tree seedlings required annually for re-planting reforestation sites has long desired ways for reducing the incidence of seedling mortality, both in the greenhouse, and after planting at the reforestation site. Compositions which can successfully enhance either the rate at which the nursery-grown seedlings mature, and/or develop during the critical growth stages which follow re-planting of those seedlings in the field, would be a welcome addition to the industry.

The present invention proposes to provide a new source of a particulate slow-release nitrogen (UF) as an economical, non-phytotoxic, biodegradable and environmentally friendly fertilizer treatment composition for seedlings which does not pollute the surrounding soil, and which is relatively inexpensive, and which optionally can effectively function with other nutrient added ingredients if desired, to provide the necessary nutrients, especially nitrogen fertilization, to a seedling.

The term non-phytotoxic refers to the property of a material in not causing plant death or serious plant injury. When used in reference to a treatment for the roots of a seedling, non-phytotoxic means that the material is capable of application to a plant in a manner which does not cause substantial toxicity (e.g., statistically significant reduction in the growth rate of the plant). Such toxicity can be measured, for example, by greenhouse trials comparing the growth of plants with various formulations of the material to controls that are not treated with the material. A material is not phytotoxic if there is no statistically significant toxicity of the material alone, or there is an offset of any significant toxicity by growth-promoting components that can be included in the treatment composition.

DETAILED DESCRIPTION OF THE INVENTION

As noted above, the present invention is directed to a particulate source of slow release nitrogen (urea-formaldehyde (UF or ureaform) polymer particles) that is useful for enhancing the delivery of nitrogen needed for plant development and growth. The invention specifically relates to slow release nitrogen (UF) particles and to the use of the particles for treating seedlings to enhance subsequent plant development and growth.

Because of the slow release character of the nitrogen particle of the present invention, upwards of twenty times the amount of nitrogen fertilizer can be supplied in many fertilizer applications than would be possible using common quick release nitrogen fertilizers available in the prior art, such as urea or methylol ureas, without damaging the plant and specifically the roots of the plant (phytotoxic effect).

In one aspect, the present invention is directed to a process for treating the root systems of seedlings undergoing transplantation, wherein an aqueous dispersion of the particulate UF polymer, the dispersion optionally containing other plant growth adjuvants, is applied to the roots of the seedlings. The treatment makes the extended release nitrogen fertilizer of the present invention available to the roots for enhancing the development and growth of the seedling and improves the survival rate of the seedlings.

In a related embodiment, the invention also is directed to a composition for coating the roots of plants (seedlings) which composition comprises an aqueous dispersion of (a) the particulate UF polymer and (b) an adhesive binder capable of forming a non-phytotoxic coating on said roots and enhancing the attachment of the UF polymer particles to the roots.

In another embodiment, the present invention can also be adapted to provide a preformed plant-growth media, which comprises a mixture of a conventional soil and optionally including conventional processed soil support material such as vermiculite, perlite, sand, and the like with the UF polymer particles of the present invention. The final soil mixture can be sterilized or pasteurized by heat or steam.

As used throughout the application and claims, the use of the term "root" and related terms is intended to embrace not only that portion of a plant which is ordinarily the underground part of a seed plant body that usually originates from the hypocotyl, but also is intended to include any portion of a plant body that upon planting into a soil (natural or synthetic), is able to generate a classical root system which functions as an organ for example of absorption, aeration and food storage, or as a means of anchorage and support for the developing and growing plant and thus includes the parts of such plants as bananas, sugar cane, garlic and the like.

The slow release nitrogen UF polymer particles of the present invention are prepared by reacting, in an aqueous environment, urea and formaldehyde at a urea:formaldehyde mole ratio of about 1:1. Ammonia may be an optional reactant, as will be understood by those skilled in the art, in an amount of up to about 25% by weight of the formed UF polymer, usually in an amount below about 10% by weight, but in the preferred embodiment of the present invention ammonia is not used at all.

To prepare the UF polymer particles of the present invention, urea and formaldehyde are reacted in admixture at a mole ratio of approximately 1:1, for example at a UF mol ratio broadly in the range of $0.7:1 \leq U:F \leq 1.25:1$ and more preferably in the range of $0.83:1 \leq U:F \leq 1.1:1$. The phase "at a mole ratio of approximately 1:1" is intended to embrace these mole ratio ranges. Particularly good results have been obtained at a U:F mole ratio between 0.95:1 and 1.05:1.

In the initial step of preparing the UF polymer particles, reaction between urea and formaldehyde is conducted in a manner to produce methylol ureas. Methods of doing this are well known to those skilled in the art and any of such known methods can be used. For example, reaction between the urea and formaldehyde can be promoted by maintaining the aqueous mixture initially at a moderate alkaline pH, with a pH in the range of about 7 to 9 being suitable and with a pH more usually between about 7.5 and 8.5, to promote the formation of methylol ureas. Given urea's inherent level of alkalinity, any required pH adjustment may be accomplished using either an acid or a base. The initial formation of methylol ureas generally can be conducted at a reaction temperature broadly in the range of 70° F. to 175° F. (about 20° C. to about 80° C.), with a reaction temperature in the range of 90° F. to 160° F. (about 30° C. to about 70° C.) more usually employed. The pH may be adjusted using commonly available acids and bases such as sodium hydroxide (caustic) and sulfuric acid and any material that can alter the pH is suitable for this purpose. The reaction pH also may be maintained (buffered) or adjusted by adding such alkaline compounds as triethanolamine, sodium or potassium bicarbonate, sodium or potassium carbonate, or other alkali metal hydroxides, such as potassium hydroxide and lithium hydroxide. Alternatively (though not generally preferred), the methylolation may also be done at a moderate acidic pH, such as in the pH range of 5.0 to 6.0, as will be recognized by those skilled in the art and the present invention is not limited by the way the initial methylolation is conducted.

Following the initial formation of methylol ureas, the nascent UF polymer then is condensed to the point where the polymer becomes insoluble in the aqueous environment. This result is preferably accomplished by rapidly acidifying the methylol ureas, to a pH below about 6, preferably below about 5 and usually to a pH below about 4, but above about 1. A pH in the range of 2.5 to 4.0 has proven to be suitable. Any organic or inorganic acid that will lower the pH can be used. Particularly suitable is a strong acid, such as a mineral acid and an organic acid such as the stronger carboxylic acids. Thus, suitable acids include formic acid, acetic acid, nitric acid, phosphoric acid, sulfuric acid and hydrochloric acid. However, in its broadest aspects the present invention is not limited by the way the further polymerization of the methylol ureas and ultimate insolubilization is conducted and obtained.

In order to produce a useful range of UF polymer particle sizes, the aqueous mixture of the methylol ureas is preferably mixed in the presence of a dispersing agent during the step of rapid polymerization which leads to insolubilization, such as the rapid acidification step, although it should be possible to get a similar result by maintaining a sufficiently high level of agitation (high shear) during the reaction in the absence of any dispersing agent. The resulting dispersion of UF polymer particles formed from the polymerization that occurs, for example, following acidification, can then be used directly (possibly following some thickening, or concentration enrichment), i.e., as a dispersion, to coat seed or sand, to treat roots, as a soil drench or soil additive, or to form a granular fertilizer, or alternately (and preferably) the dispersion of UF polymer particles can be recovered or isolated from the dispersion to produce a UF polymer powder, which then is used in any of the various applications noted above. The UF particulates formed in this manner have approximately 36% by weight nitrogen.

Particularly in the preferred embodiment, most of the nitrogen is chemically bound in the UF polymer particulates and thus is agronomically unavailable until microorganisms, principally bacteria, enzymatically (e.g., using urease and nitrogenase) degrade the polymer into a form useable by a growing plant. It is this property that leads to labeling the UF polymer particle "slow release" or "extended release." A small amount of the nitrogen, typically on the order of 5% by weight of the particulate, may be of the fast or quick release variety (e.g., principally unreacted urea) and thus may be immediately available to a seed or plant. Because the UF polymer has only about 5% quick release nitrogen, however, the chance of over fertilization using the particulate source of nitrogen of the present invention is minimal. However, if desired, the reaction conditions (including the mole ratio of reactants) and/or the extent of the reaction also can be adjusted such that a higher amount of free urea is present in/with the UF polymer particles, up to about 10% by weight, as a way to deliver more immediately available nitrogen for a quicker initial development or greening effect. Such adjustments are well within the skill of the art in view of the present disclosure.

Skilled practitioners recognize that the formaldehyde and urea reactants used to make the UF polymer of this invention are commercially available in many forms. Any form of these materials, which can react with the other reactant and which does not introduce extraneous moieties deleterious to the desired reaction and reaction product, can be used in the preparation of the slow release nitrogen, urea-formaldehyde polymer particles of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used sources of formaldehyde. Formaldehyde also may be available as a gas. Each of these sources of formaldehyde is suitable for use in the preparing the UF polymer of this invention. Generally, for ease of use, formalin solutions are preferred as the formaldehyde source. In addition, some of the formaldehyde may be replaced with another aldehyde, such as acetaldehyde and/or propylaldehyde that can react with urea. Glyoxal may also be used in place of formaldehyde, as may other aldehydes not specifically enumerated.

Urea also is available in many forms. Solid urea, such as prill, and urea solutions, typically aqueous solutions, are commercially available. Further, urea often is chemically combined with formaldehyde in the form of a urea-formaldehyde concentrate, such as UFC 85, or as a commercially-available solution containing about 25 weight percent urea, about 60 weight percent formaldehyde, and about 15 weight percent water, available under the trademark STA-FORM 60.® Each of these sources of urea can be used in preparing the UF polymer of this invention.

The urea-formaldehyde condensation reaction that results in the UF polymer particles of this invention is preferably conducted in an aqueous environment. As noted above, the reaction is conducted until the growing urea-formaldehyde polymer becomes insoluble in the aqueous reaction medium. A dispersing agent is preferably included in the water to facilitate the production of small polymer particles by the reaction. One suitable dispersant is the line of DAXAD dispersants commercially available from Hampshire Chemicals, a subsidiary of the Dow Chemical Company. One of the classes of these dispersants is a condensed naphthalene sulfonate. Both the high and low molecular weight species of this product line have been shown to be suitable, such as DAXDAD 19. A variety of other dispersants, or surfactants also can be used, including those that might be classified as anionic, such as polyacrylates (also available under the DAXAD label—such as DAXAD 30 from Hampshire Chemicals). Nonionic and cationic dispersant compounds also can be used. Suitable alternative materials can be identified using routine experimentation. The nature of the specific dispersant/surfactant is not critical. Another example would be a lignosulfonate salt or lignin. It is also possible to dispense with the use of any dispersant, provided that the reaction medium is sufficiently agitated (high shear) during the UF condensation reaction to promote the formation of small polymer particles.

The amount of dispersant to include in the aqueous solution of methylol urea at the time of the insolubilization reaction can be readily determined by those skilled in the art. The amount depends to some extent on the particular dispersant chosen to use and the concentration of methylol urea in the aqueous reaction medium. Generally, the urea and formaldehyde reactants and the water vehicle are provided in amounts to yield a methylol urea concentration that ultimately provides a dispersion of UF polymer particles at about a 20% by weight solid concentration up to about 60% by weight solids. More usually, the materials are provided so that the UF polymer dispersion is between about 30% and 55% by weight solids. Under these conditions, the dispersing agent is generally supplied at a concentration of between about 0.1% and 5% by weight, and more often in at least about 0.5% by weight up to about 2% by weight.

The particle size of the UF polymer particulate material may vary fairly widely. In general, a particular size is dictated by the specific application for which the particle is too be used. In some applications, such as when used as a soil additive, the particle size is less critical than when it may be used for example in a seed coating where is likely would be desirable to have a particle size smaller than the seed itself and usually substantially smaller than the seed. Producing small UF particles helps one better obtain a necessary and desired degree of adhesion of the UF particles in such applications. By using the preferred method of making the UF polymer in the presence of a dispersant, it is easy to produce most of the UF particles sufficiently small so as to pass through a 100 mesh (U.S. or Tyler) screen, and generally at least a major portion also pass through a 200 mesh screen. Thus, most of the UF polymer particles will be smaller than about 150 microns and a large number of them may be smaller than about 75 microns. While there is virtually no lower limit to the UF polymer particle size for practicing the invention; as a practical matter, most particles will be larger than one micron. Most of the particles, prepared using the procedures and materials noted above, have a particle size in the range of 10 to 80 microns, with a number average particle size between about 25 and 35 microns. A number average particle size of about 30 microns is quite common.

In the broad practice of this invention, the aqueous dispersion of UF polymer particles can be used directly to treat nursery-grown seedlings before transplanting, e.g., at a reforestation site, such as by applying the suspension to the seedling roots e.g. as a dip. Alternatively the solid UF particles can be isolated from the dispersion before use and then re-formulated as a root dip composition. If there is a desire to isolate the particles, and that may be preferred in some applications, then according to the broadest aspects of the invention, any way for isolating the UF polymer particles from the aqueous UF polymer dispersion can be used. For example, the UF polymer particles in the dispersion may be isolated by filtration and oven drying, or by thin film evaporation. When using these latter techniques, it may then be necessary to reduce the particle size of the recovered solids, for example by grinding, to obtain a desired particle size or size distribution for a specific application.

Another, often preferred, way of isolating or recovering the UF polymer particles from the UF dispersion formed by the polymerization of urea and formaldehyde as described above, is by spray-drying. As used herein, the terms "spray dryer" and "spray drying" refer to the technically sophisticated process of atomizing (in the form of finely divided droplets) the UF dispersion or slurry into a gas stream (often a heated air stream) under controlled temperature conditions and under specific gas/liquid contacting conditions to effect evaporation of water from the atomized droplets and production of a dry particulate solid product. Spray drying as used herein is typically carried out with pressure nozzles (nozzle atomization) or centrifugal atomizers operating at high speeds (e.g., a spinning disc). Despite the high velocity generation of droplets, a spray dryer is designed so that the droplets do not contact the spray dryer wall under proper operating procedures. This effect is achieved by a precise balance of atomizer velocity, air flow, spray dryer dimensions of height and diameter, and inlet and outlet means to produce a cyclonic flow of gas, e.g., air in the chamber. A pulse atomizer also can be used to produce the small droplets needed to facilitate evaporation of the water. In some cases, it may be desirable to include a flow promoter, such as an aluminosilicate material, in the aqueous dispersion that is processed in a spray dryer simply to facilitate subsequent handling and transport of the spray dried UF powder (e.g., to avoid clumping).

Thus, in the broad practice of this invention, either the aqueous dispersion of slow release nitrogen particles itself, or more preferably the isolated, powdered UF polymer, slow release nitrogen, recovered from the aqueous dispersion, preferably by spray-drying, then is used in the desired application.

Plant seedlings for treatment in accordance with the present invention are typically prepared by first removing the seedling or immature plant with roots, stem and leaves, from the nursery soil in which it has been growing. Any soil clinging to the roots can be removed by washing. Bare root seedlings i.e. seedlings that are freed from the container and soil in which they have grown, then may be treated by dipping the roots thereof in a dispersion of the UF polymer particles. It may also be desirable to sterilize the roots first by soaking in a solution containing sodium hypochlorite at about 0.5 to 1% (v/v) for 20 seconds before treatment with the composition of this invention. Alternatively, roots having a molded soil coating also can be treated using the root dip composition and procedures of the present invention.

The aqueous root treatment dispersion or suspension then is applied to the roots by any convenient method. One convenient method of applying the coating composition to the roots of a plant is to simply dip the roots into a container of the coating composition for a suitable period of time to adhere a sufficient quantity of the particulate UF polymer to the roots such that the particles remain with the roots. On planting the seedling, the particulate UF polymer sticks close to the roots and is available to the plant over a prolonged period.

Alternatively, the treatment composition of the present invention could be applied by spraying the roots with the aqueous dispersion, for example, in an automated process.

Preferably all of the root tissue is coated with the treatment composition (e.g., at least 50%, preferably at least 75%, and most preferably about 90–100%).

The treatment composition then is allowed to at least partially dry (a few seconds to a few minutes) to maintain the integrity of the applied treatment composition particularly if the plant is to be immediately transplanted. Alternatively, the dipped plant could be transferred directly to a cone or plug (e.g., agar, peat moss, soil, etc.) for future transplantation.

In a related embodiment, the root dip composition can be formulated in a way to provide a more durable coating on the roots of plants (seedlings) by providing an aqueous dispersion of (a) the particulate UF polymer and (b) an adhesive binder capable of forming a non-phytotoxic coating or film on said roots and thus enhance the attachment of the UF polymer particles to the roots (and also possibly improve moisture retention by the roots). In the broad practice of this embodiment, the nature of the adhesive binder is not narrowly critical. Any non-toxic, biocompatible adhesive material should be suitable.

Adhesive classes which can potentially be used as the adhesive binder in this embodiment include, but are not limited to, animal hide glues, celluloses including ethyl celluloses, methyl celluloses, hydroxymethyl celluloses, hydroxypropyl celluloses, hydroxymethyl propyl celluloses, carboxy methyl celluloses, polyvinyl alcohols and polyvinyl alcohol copolymers, dextrins, malto-dextrins, alginates, sugars, molasses, polyvinyl pyrrolidones, polyvinyl acetates and polyvinyl acetate copolymers, polysaccharides, fats, oils, proteins, gum arabics, shellacs, vinylidene chlorides, vinylidene chloride copolymers, lignosulfonates, starches, acrylate polymers and copolymers, such as polyvinyl acrylates, zeins, gelatins, chitosan, polyethylene oxide polymers, acrylamide polymers and copolymers, polyhydroxyethyl acrylates, methylacrylamide polymers, polychloroprenes, poly (methyl vinyl ether)-maleic anhydride copolymers, vinylpyrrolidone/styrene copolymers, vinyl acetate/butyl acrylate copolymers, styrene/acrylic ester copolymers, vinyl acetate/ethylene copolymers and polyurethane polymers. Crosslinkable silicone materials as described in U.S. Pat. No. 4,753,035 also can be used. Still other materials, including natural inorganic materials such as silica gel and clay may also be suitable in some applications as will be readily apparent to those skilled in the art.

When using an adhesive binder to enhance the attachment of the particulate UF polymer to the root of a seedling, it is preferred that the binder form a flexible coating or film on the root stem. The ability of a particular binder to form a flexible coating or film in this application can readily be determined experimentally. For example, one can coat the adhesive binder on a flexible substrate, such as a teflon-coated sheet of aluminum foil, dry the binder material, and determine whether the resulting layer can readily be peeled to form a flexible film.

A preferred root treatment formulation of the present invention thus is generally an aqueous dispersion of the particulate UF polymer together with an adhesive binder material capable of forming a non-phytotoxic root coating. In formulating these preferred root dipping compositions to effect fertilization of the seedling, the amount of binder material to employ will depend primarily on the binder selected, and its biocompatibility with the plant to be treated. In general, however, the adhesive binder material will normally constitute from about 0.5 wt. % to about 20 wt. % of the root treating composition. More typically, the adhesive binder material will constitute from about 1% to about 15% by weight of the aqueous dipping composition. As recognized by those skilled in the art, root dipping compositions generally should be maintained at a pH between from about 4 to about 9.

The UF polymer particles of the present invention typically are included in the root dip composition in an amount between about 10% to 60% by weight of the aqueous composition, and more usually in an amount of from 20% to 55% by weight.

The time of the soak also is generally not critical and can be from a time sufficient simply to immerse the roots into and out of the dipping composition, i.e., for a few seconds, up to a time in the range of from 0.5 hours to 4.0 hours, with a preferred root soak time occurring from about 0.001 hours to 0.5 hours.

In an alternative embodiment to the root dipping application, the aqueous composition can be applied directly to the soil in which the seedling is to be planted and grown e.g. as a soil drench. It also should be understood that treatment can also occur at the planting site by directly placing the UF polymer powder into the soil opening (hole) along with the tree seedling.

By soaking the soil surrounding the roots with the dispersion or by mixing the UF powder in the vicinity of the planting, the nutrient concentration in the seedling root zone is increased before re-planting, so as to enhance seedling survival and establishment in the early stages of growth at, for example a reforestation site.

In yet another embodiment, the present invention is also directed to a preformed plant-growth media, which comprises a mixture of the UF polymer particles of the present invention with conventional soil ingredients. Conventional soil ingredients include decayed organic matter (compost or "soil"), superabsorbents, vermiculite, perlite, sand, peat moss, dolomitic limestone, lava rock, micronutrients, a potassium source, a phosphorus source, bark chips and similar materials. The enhanced soil composition (soil additive embodiment) is prepared simply by mixing one or more of these conventional soil ingredients with the UF polymer particles of the present invention. The final soil mixture can be sterilized or pasteurized by heat or steam before use.

In addition to the slow release nitrogen, UF polymer solid particles, a variety of other additives, including other agriculturally acceptable particulate materials, may also be combined with the UF polymer particles in the root dipping formulation and soil additive embodiment. Some materials may exhibit a high degree of water solubility, and thus may be mixed with the UF polymer dispersion before its use. In fact, in some cases one may be able to mix such materials, especially the water soluble materials, with the UF polymer dispersion prior to spray-drying.

Included in materials that can be used in combination with the UF polymer particles are materials commonly used in fertilizer applications, and referred to herein as plant growth adjuvants, these adjuvants are not toxic to the plant, or harmful to the soil environment in which the plant is growing. Such materials may include calcium carbonate (agricultural lime) in its various forms for adding weight and/or raising the pH of acid soils; metal containing compounds and minerals such as gypsum and dolomite, metal silicates and various micronutrient metals such as iron, zinc and manganese; talc; elemental sulfur; activated carbon, which may act as a "safener" to protect against potentially harmful chemicals in the soil; pesticides, herbicides and fungicides to combat or prevent undesired insects, weeds and disease, super absorbent polymers, wicking agents, wetting agents, plant stimulants to accelerate growth, growth regulators, such as ascorbic acid (AA), gibberellic acid (GA) and indoleacetic acid (IAA), microorganisms, an inorganic (N—P—K) type fertilizer, sources of phosphorus, sources of potassium, and organic fertilizers, such as urea as a way to deliver more immediately available nitrogen for a quicker initial greening effect, surfactants, initiators, stabilizers, cross linkers, antioxidants, UV stabilizers, reducing agents, colorants and plasticizers. Mixtures of these different materials may of course also be employed.

The most important macronutrients are nitrogen, phosphorus, potassium and calcium but in many instances it may be worthwhile that others also be present in the root dip composition. The more important micronutrients are zinc, iron and manganese, but as with the macronutrients it may be worthwhile in some circumstances that others also be present. Phosphorus can be conveniently added as free phosphoric acid, or as a substituted salt of an inorganic or organic phosphorus-containing acid. Potassium is conveniently added as potassium hydroxide or as a potassium containing salt.

In a preferred aqueous dispersion suitable for root-dipping, the UF polymer particles of the present invention are preferably present in a quantity of about 100–500 g/l, a phosphorus source may be present in a quantity of about 30–125 g/l, calculated as $P_2O_5$, and a potassium source may be present in a quantity of about 50–150 g/l, calculated as $K_2O$. In many applications, it also will be desirable to include micronutrients in the dipping composition, preferably in an amount of at least about 0.1 ppm, such micronutrients can conveniently be supplied to the dipping composition as anions such as borate or, molybdate, or as salts of inorganic or organic acids such as copper sulfate or copper acetate, or as inorganic or organic complexes such as iron chelate.

In this regard, the disclosure of U.S. Pat. No. 5,797,976, which provides an extensive list of nutrients and other plant growth adjuvants for enhancing the growth and development of plants, is herein incorporated by reference in its entirety for its disclosure.

The methods and compositions described above are particularly suitable for reforestation. The tree seedlings can be either hardwoods or softwoods. Examples of suitable softwoods, of course, include conifers, such as pine and, Pacific yew, and also birch and poplar. Examples of suitable hardwoods would include oak, walnut, maple, cherry and the like. The methods and compositions can also be used with rubber, coffee, bananas, garlic, tea, cocoa, oil palm, sugar cane and citrus trees.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

EXAMPLE 1

A urea-formaldehyde (UF) dispersion, suitable for producing UF polymer particles of the present invention, is prepared as follows. Water (32.3 parts by weight) and a 50% aqueous solution of formaldehyde (31.8 parts by weight) are added to a reaction vessel equipped with vacuum reflux, a heater and a mixer. While adjusting the temperature of the agitated aqueous mixture to 100° F., its pH is also adjusted to about 7.0 (6.8 to 7.2) using either 50% caustic (NaOH), or 35% sulfuric acid, as needed. Once the aqueous mixture has been heated to 100° F. (about 38° C.), 31.8 parts by weight of prilled urea also is added and mixing is continued. The temperature of the agitated aqueous mixture then is increased to 120° F. (about 50° C.) and held for a time (usually about 15 minutes) sufficient to dissolve the urea.

While maintaining the temperature of the agitated mixture at 120° F. (about 50° C.), the pH is adjusted to within the range of 8.0 to 8.4, again using either 50% caustic (NaOH), or 35% sulfuric acid as needed. Using, as appropriate, a combination of the reaction exotherm and external heating, the reaction mixture is heated to a temperature of 158° F. and the temperature is controlled using vacuum reflux. The pH of the mixture is adjusted, as needed, to about 7.8 to 8.2, using either 50% caustic (NaOH), or 35% sulfuric acid. The agitated mixture is held at a temperature of about 158° F. (70° C.) for about 30 minutes and the pH continues to be adjusted, as needed, to about 7.8 to 8.2, using either 50% caustic (NaOH), or 35% sulfuric acid so that the reactants form methylol ureas. While continuing agitation, the aqueous mixture is cooled to about 105° F. (about 40° C.) and a dispersant (one part by weight of DAXAD 19) is added while the batch is cooled. Upon reaching 105° F. (about 40° C.), the batch is placed under full vacuum. While maintaining full vacuum and applying cooling to the agitated batch, the pH of the aqueous mixture is adjusted, as quickly as possible, to a pH of about 3.3 to 3.5, using 35% sulfuric acid, at which point the batch may exotherm to a temperature of above 175° F. (about 80° C.) before the exotherm subsides. This procedure causes rapid condensation of the methylol ureas to a solid network polymer. After completing the pH adjustment, the temperature of the aqueous mixture is cooled to 105° F. (about 40° C.) as quickly as possible while it is held for 20 minutes. Following the 20 minute holding period, the pH of the aqueous mixture is adjusted to 6.5 to 7.5, using either 50% caustic (NaOH), or 35% sulfuric acid, as needed, and then is discharged to storage. The UF polymer dispersion at about 38 weight percent solids should be agitated during its storage.

EXAMPLE 2

The dispersion made in accordance with Example 1 can then be spray dried to produce UF polymer particles. A Niro P6 spray dryer can be fed with 15 pounds per hour of the dispersion of Example 1. The spray dryer receives an inlet gas stream at a flow rate of about 415 standard cubic feet per minute and a temperature of 330–340° F. (165–170° C.). The outlet temperature of the spray dryer was measured as 75–95° F. (25–35° C.). The recovered UF polymer particle product (at about 1 wt. % moisture) had particle sizes distributed from 10 to 80 microns, with a number average size of 30 microns.

EXAMPLE 3

Using a Niro industrial-sized spray dryer (ON 030-5051), a UF polymer dispersion made in accordance with Example 1 having about a 38 wt. % solids content, at a temperature of 28° C. and at a feed rate of 100 lbs/minute was spray-dried with the atomizer wheel operating at 13,000 RPMs. Air, at a flow rate of 49,400 standard cubic feet per minute and at a temperature of 186° C. was delivered to the spray dryer. The outlet air temperature was measured as 88° C. Spray-dried UF polymer particles were recovered from the spray dryer.

EXAMPLE 4

Figure 1:
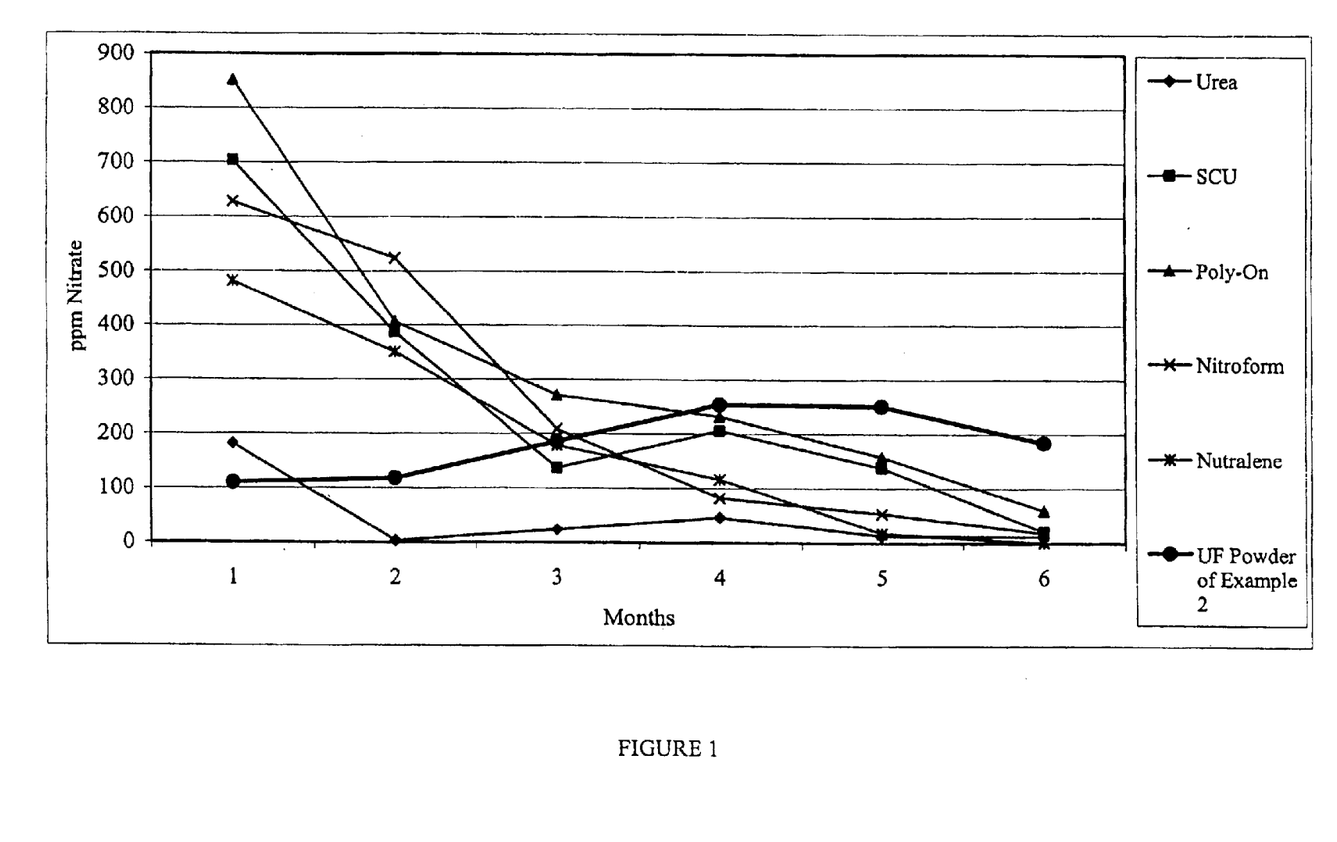
FIG. 1 is a graph showing the lysimeter results (nitrogen release rate) over a six (6) month time period for the UF polymer powder (particulate) of the present invention as compared with several commercially available sources of nitrogen fertilizers.
Figure 2:
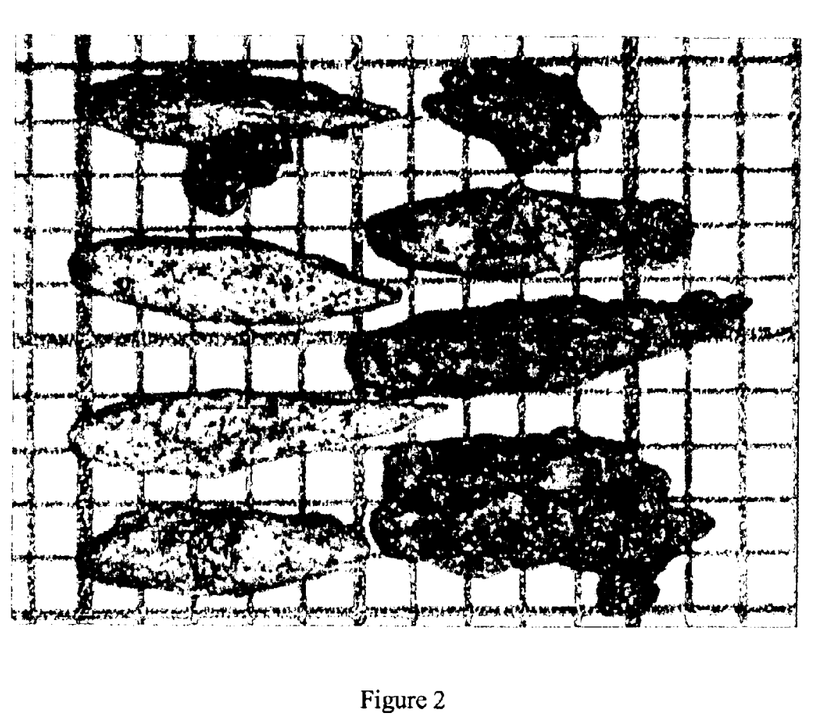
FIG. 2 is a photomicrograph of tall fescue seeds having an adherent coating containing slow release nitrogen particles made in accordance with the present invention.

In order to assess the release performance of the UF powder of the present invention, the sprayed dried UF powder product of Example 3 was tested in an incubation lysimeter, a procedure developed by Dr. Jerry Sartain of the University of Florida. An individual lysimeter is simply a 12 inch long piece of 3" diameter PVC piping. The pipe has a permanent cap on the bottom and a removable cap on the top. The bottom cap has an opening where water can drain and vacuum can be applied to remove excess water. A sand-soil mixture is prepared by mixing ninety-five (95) parts sand and five (5) parts topsoil. An amount of the sand-topsoil mixture sufficient to fill the column then is mixed thoroughly with an amount of each of the fertilizers to be tested sufficient to provide 450 mg of nitrogen in the column. After filling the lysimeter column, enough water is added to moisten the column contents. The column then is ready for the start of the testing. Once a month, 500 milliliters of 0.01M citric acid is added to the column, allowed to flow downwardly through the column, and is collected from the bottom drain. Any excess water (citric acid) is removed from the column using a vacuum and combined with the amount collected from the drain. The collected liquid is analyzed for nitrogen (nitrate and ammonia) content. The amount of nitrogen (nitrate and ammonia) eluted from the column each month is determined. In addition to the UF powder of Example 6, sulfur coated urea (SCU), a polymer coated urea (Poly-On), a low molecular weight methylene urea (Nitroform) and an even lower molecular weight methylene urea (Nutralene) also were tested. Each material was tested in triplicate and the results of the testing are illustrated in the FIG. 1. The graph of FIG. 1 plots the total nitrate released each month (average of three replicates) over a six month period of time. As shown, the UF powder had the lowest level released in the first month and then sustained the highest levels of release in the fourth, fifth and sixth months. Furthermore, as shown by the release curve in FIG. 1, the release rate of nitrogen (as nitrate) from the UF polymer particles of the present invention is substantially uniform (constant) over a period of six months.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5%.

We claim:

1. A method for treating a seedling to provide post-planting growth and survival enhancement which comprises exposing roots of the seedling to a particulate urea-formaldehyde polymer either by adhering the particulate urea-formaldehyde polymer on the roots of the seedling, or by adding the particulate urea-formaldehyde polymer to soil in which the seedling is planted, wherein the particulate urea-formaldehyde polymer is made by acidifying a aqueous methylol urea solution, and wherein the aqueous methylol urea solution either contains a dispersing agent or is subjected to a high shear condition during the acidifying, to form an aqueous dispersion of insoluble urea-formaldehyde polymer particles.

2. The method for treating a seedling of claim 1 wherein the aqueous methylol urea solution is made by reacting urea and formaldehyde at a urea:formaldehyde mole ratio of approximately 1:1.

3. The method for treating a seedling of claim 1 wherein the aqueous methylol urea solution is made by reacting urea and formaldehyde at a urea:formaldehyde mole ratio of approximately 1:1 and wherein the methylol urea solution contains a dispersing agent during the acidifying.

4. The method for treating a seedling of claim 2 wherein the aqueous methylol urea solution is made by reacting urea and formaldehyde at a urea:formaldehyde mole ratio of 0.83:1 to 1.1:1.

5. The method for treating a seedling of claim 3 wherein the aqueous methylol urea solution is made by reacting urea and formaldehyde at a urea:formaldehyde mole ratio of 0.83:1 to 1.1:1.

6. The method for treating a seedling of claim 1 wherein the aqueous methylol urea solution is made by reacting urea and formaldehyde at a urea:formaldehyde mole ratio of 0.95:1 to 1.05:1 and wherein the methylol urea solution contains a dispersing agent during the acidifying.

7. The method for treating a seedling of claim 1 wherein the aqueous methylol urea solution is made by reacting urea and formaldehyde at a urea:formaldehyde mole ratio of 0.95:1 to 1.05:1.

8. The method for treating a seedling of claim 1, 2, 3, 4, 5, 6, or 7 wherein the aqueous dispersion of urea-formaldehyde polymer particles is dried to recover the urea-formaldehyde polymer particles as a powder.

9. The method for treating a seedling of claim 8 wherein the aqueous dispersion of urea-formaldehyde polymer particles is dried by spray drying.

10. An aqueous root dip composition suitable for treating a seedling to provide post-planting growth enhancement which comprises an aqueous dispersion of a particulate urea-formaldehyde polymer containing an adhesive binder, wherein the particulate urea-formaldehyde polymer is made by acidifying a aqueous methylol urea solution, and wherein the aqueous methylol urea solution either contains a dispersing agent or is subjected to a high shear condition during the acidifying, to form an aqueous dispersion of insoluble urea-formaldehyde polymer particles.

11. The root dip composition of claim 10 also containing a plant growth adjuvant.

12. The root dip composition of claim 10 or 11 wherein the particulate urea-formaldehyde polymer is formed from an aqueous solution of methylol urea made by reacting urea and formaldehyde at a urea:formaldehyde mole ratio of 0.95:1 to 1.05:1; by acidifying the aqueous methylol urea solution, wherein the aqueous methylol urea solution either contains a dispersing agent or is subjected to a high shear condition during the acidifying.

13. The root did composition of claim 12 wherein the wherein the methylol urea solution contains a dispersing agent during the acidifying.

14. A composition for supporting the growth of plants comprising a mixture of a soil component and a particulate urea-formaldehyde polymer made by acidifying a aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the aqueous dispersion to recover the urea-formaldehyde polymer particles.

15. The composition of claim 14 wherein the soil component is selected from the group consisting of decayed organic matter, superabsorbent, vermiculite, perlite, sand, peat moss, dolomitic limestone, lava rock, micronutrient, potassium source, phosphorus source, and bark chips.

16. The composition of claim 15 wherein the aqueous methylol urea solution is made by reacting urea and formaldehyde at a urea:formaldehyde mole ratio of 0.95:1 to 1.05:1 and wherein the methylol urea solution contains a dispersing agent during the acidifying.

17. The composition of claim 16 wherein the aqueous dispersion of urea-formaldehyde polymer particles is dried by spray drying.

* * * * *